Feb. 28, 1933.    C. D. AINSWORTH    1,899,658
OUTDOOR ELECTRICAL APPARATUS
Filed Nov. 25, 1929    2 Sheets-Sheet 2
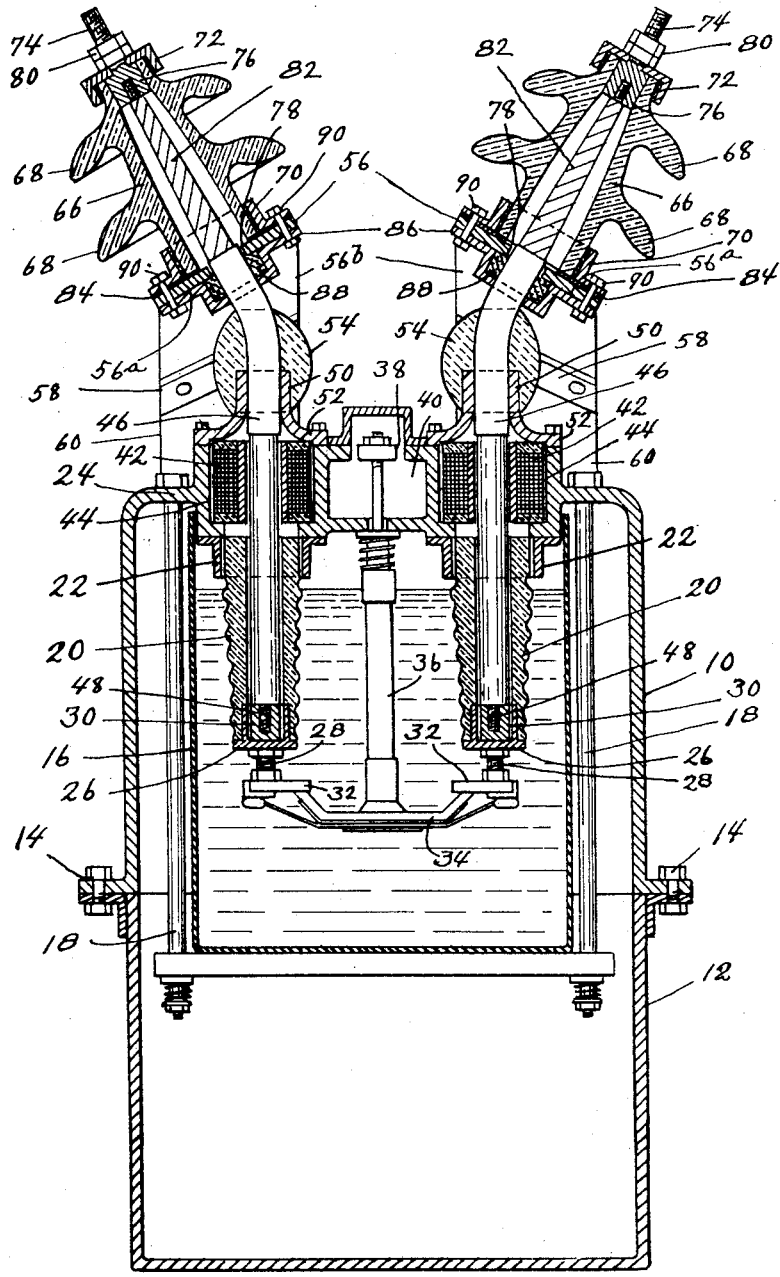
Fig.2.    Inventor.

Patented Feb. 28, 1933

1,899,658

UNITED STATES PATENT OFFICE

CHESTER D. AINSWORTH, OF WOLLASTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

OUTDOOR ELECTRICAL APPARATUS

Application filed November 25, 1929. Serial No. 409,534.

This invention relates to electrical apparatus and particularly to electric switches. There is a type of electrical apparatus and particularly an electric switch designed to be installed under ground or in subways and wherein the conducting leads which are connected with the apparatus are flexible metalsheathed electric cables which pass into the enclosing casing of the apparatus and are connected to the apparatus, as the stationary switch terminals, within the casing, the metal sheaths of the cables being soldered or otherwise secured in a water-tight manner to the wall of the casing through which they pass. It is sometimes desirable to use this underground type of apparatus above the surface. It may be desirable for instance to mount an underground electric switch on a platform or a pole above the surface of the ground and exposed to the weather. The underground type of switch is particularly adapted for such purposes since the enclosing casing is made weather-tight.

When an underground switch is used in overhead service the conductors to be connected therewith are usually bare conductors which cannot be extended into the enclosing casing like the insulated cable sheath used in underground service. Consequently, it is an object of this invention to adapt an underground type of switch for use in overhead service and particularly to provide the underground type of switch with suitable insulated terminals to which the bare line conductors can be connected.

A further object of the invention is the provision of an underground type of electric apparatus, as a switch, with suitable insulated terminals and connections between said terminals and the operative parts within the enclosing casing so that the apparatus can be adapted for outdoor service.

A further object of the invention is generally to improve the construction of electric switches and allied apparatus.

Fig. 2 is a section along line 2—2 of Fig. 1.

Figure 1:
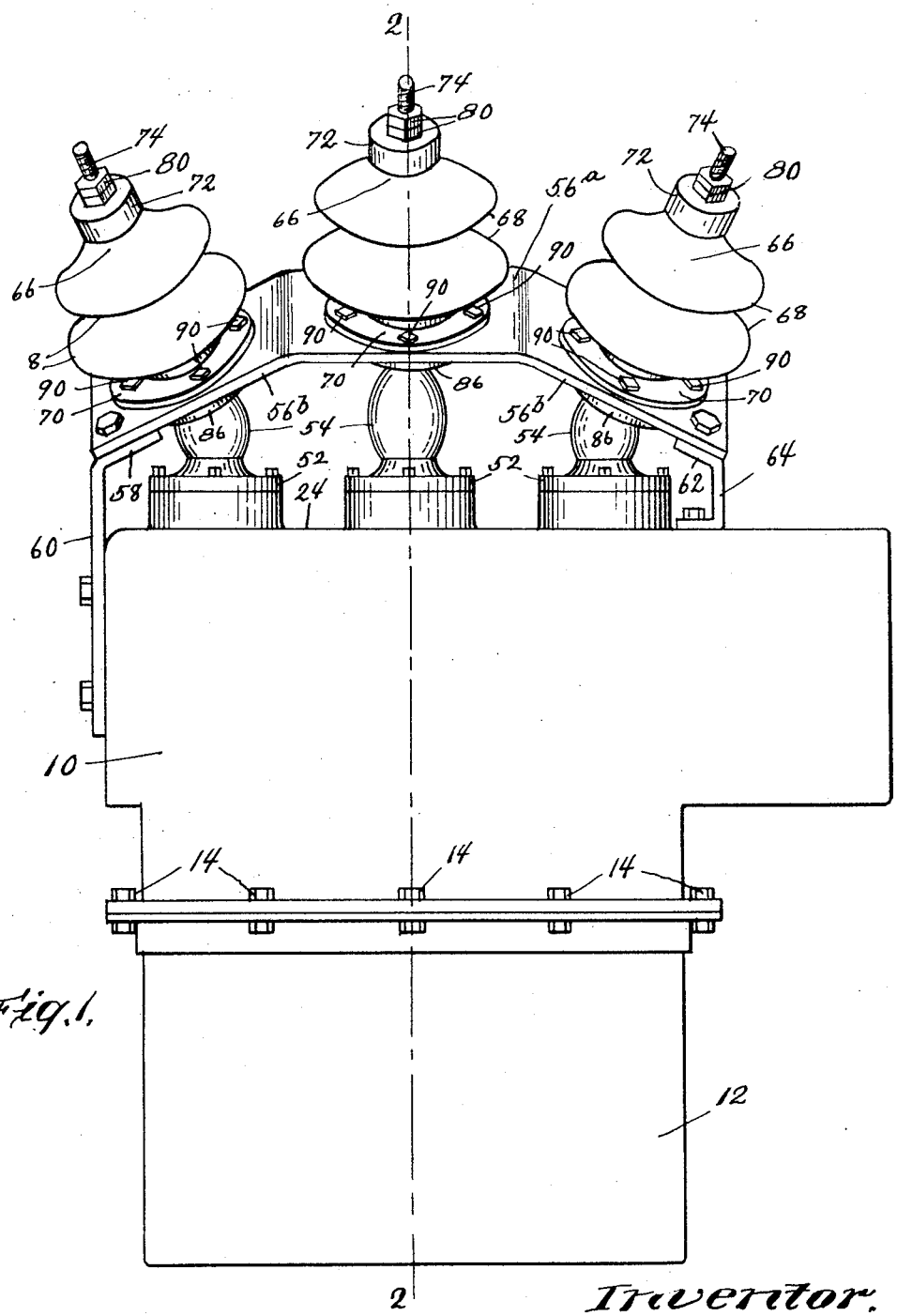
Fig. 1 is a side elevation of an electric switch embodying the present invention.

The electric switch here shown as embodying the present invention includes a weather-tight enclosing casing having the upper portion 10 and the lower portion 12, the two parts being detachably connected in a weather-tight manner by means including the bolts 14. An oil receptacle 16 is located in the upper part of the casing and is supported by rods 18. Insulators 20 are secured by attaching flanges 22 to the top wall 24 of the upper casing section 10 and depend therebelow into the oil in the tank 16. Stationary switch members are carried by the lower ends of the insulators. Said switch members include plates 26 which are attached to the lower ends of the insulators and screwthreaded rods 28 which are passed through said plates and have enlarged heads 30 that are located within the insulators. Contact plates 32 are fixed to said rods beneath the insulators and are engaged and bridged by a movable bridging member 34 which is carried by an insulating lifting rod 36 and moved vertically to engage and disengage said plates 32 by operating mechanism including the operating rod 38 which is located in a mechanism well 40 formed in the top wall of the casing. Current transformers 42 are located in transformer wells 44 formed in the top wall of the casing above and aligned with the insulators 20. Connection is established between the stationary switch members and the external circuit leads through flexible metallic or lead sheathed cables 46, which cables are inserted through the transformers and through the passages in the insulators and have their conductors 48 at the lower ends thereof connected electrically to the enlarged heads 30 of the stationary switch members. The cables pass through upstanding necks 50 of cover plates 52 which are fixed detachably to the top wall 24 of the casing over and in enclosing relation with the transformer wells 44. The lead sheaths of the cables extend through the necks and terminate a substantial distance above the stationary switch members and are soldered in a water-tight manner to the necks by the wipe joints 54. The construction above described illustrates a typical underground or subway switch which is now well known and need not be further described. It is specifically described and claimed in the copending application of Joseph D. Wood, Serial No. 745,994, filed October 27, 1924, and assigned to the assignee of the present invention.

The switch here shown is a three-phase switch and has three sets of terminals which are located within the enclosing casing.

When used for underground or subway work, the lead sheathed cables extend from the switch for substantial distances underground and may terminate at other switches or other electrical apparatus.

The type of switch above described is well adapted for overhead service, either for emergency or for permanent use, since it is weather-tight. Overhead line conductors, however, are usually bare, at least they are not usually metal sheathed cables. Thus, they cannot be extended into the interior of the casing and through the insulators 20 in the manner of the lead sheathed cables herein described. Consequently, it is the purpose of this invention to provide the switch with exposed and weather-proof insulated terminals to which the usual overhead conductors can be connected.

In accordance with this invention, the switch is provided with two terminal supports 56, one for each set of three terminals of the switch. The terminal supports consist of flat bars having substantial strength, each bar having a middle section 56a and downwardly-reflexed ends 56b, each section being adapted to support an insulated switch terminal. The purpose of the inclined ends 56b is to provide support for the terminals such that the terminals are inclined away from each other, or are divergent, thereby to provide a spacing between their exposed ends which is greater than the spacing between the switch members under oil and is sufficient to prevent the formation of flash-over arcs between them at the normal potential of the line connected with the switch. The two insulator supports are inclined with respect to each other as is best shown in Fig. 2 for the purpose of providing a long distance between their exposed terminals. The supports are secured to the switch frame above the top wall thereof in any suitable manner. One inclined end 56b of each support is herein shown as resting upon and secured removably to a reflexed ear 58 of a vertical plate 60 which is bolted to an end wall of the switch casing. The other inclined end of the support is illustrated as bolted removably to the inclined ear 62 of a bracket 64 that is bolted to the top wall of the switch casing. Outdoor-type insulating bushings 66 having petticoats 68 are cemented to attaching flanges 70 and are secured by means of said flanges to the sections 56a and 56b of said supports and thus, by reason of the inclination of said support and also by reason of the inclined sections thereof, all of the bushings have their upper ends divergent. The bushings are provided with metal caps 72 which have terminal rods 74 extended therethrough which rods are provided with enlarged heads 76 located within the bushing under said caps. When the switch above described is adapted for outdoor use the cables 46 are cut to the proper lengths and located in the switch as above described. The upper ends of the cables are reflexed outwardly and in divergent relation with each other and are extended through cable openings 78 in the sections of the supports 56. The upper ends of the conductors 48 are connected with the enlarged heads 76 of the bushing terminals 74 and said terminals are provided with clamping nuts 80 or the equivalent by means of which line conductors can be connected thereto. The metal sheath of the cable preferably is terminated at the supports 56 to expose the conductor insulation 82 of the bushing and said insulation may be tapered, as illustrated, up to the bare end of the conductor where it connects with the bushing terminal. The connection between the bushings and the supports 56 may be made weather-tight by the provision of a packing disc 84 between the supports and the clamping flanges 70 of the bushing. Weather-tight connections are made between the cables and supports by the provision of flanges 86 which surround said cables at the metal sheaths thereof and are located on the under sides of the supports. The flanges are provided with necks having recesses therein in which compressible packing material 88 is located. The bolts 90 which secure the bushings to the supports also pass through the flanges 86 and are arranged to hold the packing material 88 in compressed and weather-tight engagement with the metal sheaths of the cables.

As thus arranged, the underground switch is provided with insulatingly-supported terminals adapting the switch for use in overhead service and for connection with exposed high tension line conductors.

I claim:

1. An electrical apparatus having an enclosing casing, a flexible cable extended out of the top of said casing having a water tight connection with said casing, a supporting frame located above the top of and carried by said casing, an insulating bushing carried by and extended above said frame in surrounding and enclosing relation with the upper end of said cable and having a terminal at its upper end which is connected with the conductor of said cable, and means providing a water tight seal between said cable and bushing.

2. An electrical apparatus having an enclosing casing, a flexible cable extended out of the top of said casing and having a water tight connection with said casing, a supporting frame spaced above the top of said casing, an insulating bushing carried by and extended above said frame in surrounding and enclosing relation with the upper end of said cable and having a terminal at its upper end which is connected with the conductor of said cable and means providing a water tight seal between said cable and bushing, said bushing and supporting frame being removable from the aforesaid relation with said cable and casing.

3. An electric apparatus including an enclosing casing, a cable extended out of the top of said casing having an inclined outer end, said cable having a water tight connection with the top of said casing, a support carried by and located above the top of said casing, an insulating bushing carried by and upstanding above said support and inclined in the direction of inclination of said cable and surrounding and enclosing the inclined end of said cable, said bushing having a terminal at its upper end which is connected electrically with the conductor of said cable, and means providing a water tight seal between said cable and bushing.

4. An electrical apparatus having an enclosing casing, a metal sheathed electric cable extended through said casing and having a water-tight connection therewith and having its exposed end inclined with respect to that portion of the cable within said casing, a support located above the top of and carried by said casing, an insulating bushing carried by said support and inclined in the direction of inclination of the exposed end of said cable and surrounding said exposed end, means securing said bushing to said support, and means providing a water-tight closure for the upper end of said bushing including a terminal carried by the upper end of said bushing having electrical connection with the conductor of said cable.

5. An electric switch including an enclosing casing, a cable extended into and terminated within said casing and having weather-tight connection therewith, an insulating bushing located above said casing over the outer end of said cable and having a terminal at its upper end which is connected electrically with the conductor of said cable, means providing a weather-tight connection between said cable and the lower end of said bushing, and means to support said bushing by said enclosing casing so that said bushing-terminal constitutes a switch terminal.

6. An electrical apparatus including an enclosing casing, a metal sheathed cable extended into and terminated within the casing and connected with the apparatus therein and having means connecting its metal sheath in weather-tight relation with the wall of said casing, an insulating bushing located above said casing and enclosing the outer end of said cable and terminated above said connecting means and having a terminal at its upper end which has an electrical connection with the conductor of said cable, means located above said connecting means which provides a separate weather-tight connection between said cable and the lower end of said bushing, and means which supports said bushing by said casing so that said bushing and its terminal constitute a terminal of the apparatus.

7. An electrical apparatus including an enclosing casing, a cable extended therethrough, a support located above the top of and carried by said casing having an aperture through which the exposed end of said cable is extended, an insulating bushing carried by and upstanding above said support and enclosing the end of said cable and having a terminal at its upper end which has an electrical connection with the conductor of said cable, means connecting said cable in a weather-tight manner with a wall of said casing, and separate means located above said first means for connecting said cable in a weather-tight manner with said support.

8. An electrical apparatus including an enclosing casing, a section of high tension cable extended into said casing, a support located above the top of said casing, said casing having a passage therein through which said cable is extended, an insulated bushing carried by and upstanding above said support in surrounding relation with said passage and cable, a terminal located at the upper end of said bushing having an electrical connection with the conductor of said cable, an attaching flange surrounding the lower end of said bushing and bearing upon said support, a packing flange surrounding said cable beneath said support and having a conductor passage therein filled with a packing material, bolts passed through both flanges and clamping them on opposite sides of said support and compressing the packing against said cable, and a weather-tight connection disposed beneath said support and packing flange connecting said cable in a weather-tight manner with said casing.

9. An electric switch including an enclosing casing, flexible high tension insulated cable-sections extended into and terminated within said casing and carried by said casing and having divergent outer ends, insulating bushings spaced from said casing and surrounding the exposed ends of said cables having terminals at their upper ends connected with the conductors of said cables, and means to support said bushings by said casing with their terminal ends in divergent relation, said supporting means comprising a bracket which overlies the top of said casing and is secured thereto and has angularly related sections on which said bushings are mounted.

In testimony whereof, I have signed my name to this specification.

CHESTER D. AINSWORTH.